(12) United States Patent
Oh et al.

(10) Patent No.: US 12,037,473 B2
(45) Date of Patent: Jul. 16, 2024

(54) POLYAMIDE-IMIDE FILM AND METHOD FOR PRODUCING SAME

(71) Applicant: SK microworks Co., Ltd., Gyeonggi-do (KR)

(72) Inventors: Dae Seong Oh, Seoul (KR); Dawoo Jeong, Gyeonggi-do (KR); Sunhwan Kim, Icheon (KR); Jin Woo Lee, Gyeonggi-do (KR); Dong Jin Lim, Gyeonggi-do (KR); Kyungeun Oh, Gyeonggi-do (KR)

(73) Assignee: SK MICROWORKS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/862,476

(22) Filed: Jul. 12, 2022

(65) Prior Publication Data
US 2022/0356317 A1 Nov. 10, 2022

Related U.S. Application Data

(62) Division of application No. 16/477,664, filed as application No. PCT/KR2018/001567 on Feb. 6, 2018, now Pat. No. 11,434,335.

(30) Foreign Application Priority Data

Feb. 8, 2017 (KR) .......... 10-2017-0017550
Sep. 21, 2017 (KR) .......... 10-2017-0122035

(51) Int. Cl.
| | | |
|---|---|---|
| C08G 73/10 | (2006.01) |
| B29C 39/24 | (2006.01) |
| B29C 39/38 | (2006.01) |
| B29C 39/42 | (2006.01) |
| B29C 39/44 | (2006.01) |
| C08G 73/14 | (2006.01) |
| C08J 5/18 | (2006.01) |
| C08L 79/08 | (2006.01) |
| B29C 41/00 | (2006.01) |
| B29K 77/00 | (2006.01) |
| B29K 105/00 | (2006.01) |

(52) U.S. Cl.
CPC .............. *C08J 5/18* (2013.01); *B29C 39/24* (2013.01); *B29C 39/38* (2013.01); *B29C 39/42* (2013.01); *B29C 39/44* (2013.01); *C08G 73/1039* (2013.01); *C08G 73/14* (2013.01); *C08L 79/08* (2013.01); *B29C 41/003* (2013.01); *B29K 2077/00* (2013.01); *B29K 2105/0094* (2013.01); *C08J 2379/08* (2013.01); *C08L 2201/10* (2013.01); *C08L 2203/16* (2013.01)

(58) Field of Classification Search
CPC ....... C08J 2379/08; C08G 73/10; C08L 79/08
See application file for complete search history.

(56) References Cited

U.S. PATENT DOCUMENTS

2016/0222249 A1* 8/2016 Choi ............... C08G 73/1039
2018/0002486 A1* 1/2018 Kim ...................... C08G 73/14

FOREIGN PATENT DOCUMENTS

CN   102093559   * 6/2011
JP   2003160664  * 6/2003

* cited by examiner

*Primary Examiner* — Gregory Listvoyb
(74) *Attorney, Agent, or Firm* — IP & T GROUP LLP

(57) ABSTRACT

An embodiment can provide a polyamide-imide film and a method for producing same, the film comprising a polyamide-imide polymer formed by polymerizing an aromatic diamine compound, an aromatic dianhydride compound and a dicarbonyl compound, wherein, in an XRD graph with a section in which 2θ=8° to 32° as a baseline, the film shows a peak area of 50% or above around 2θ=23° with respect to a peak area seen around 2θ=15°.

6 Claims, 3 Drawing Sheets

[Fig. 1]
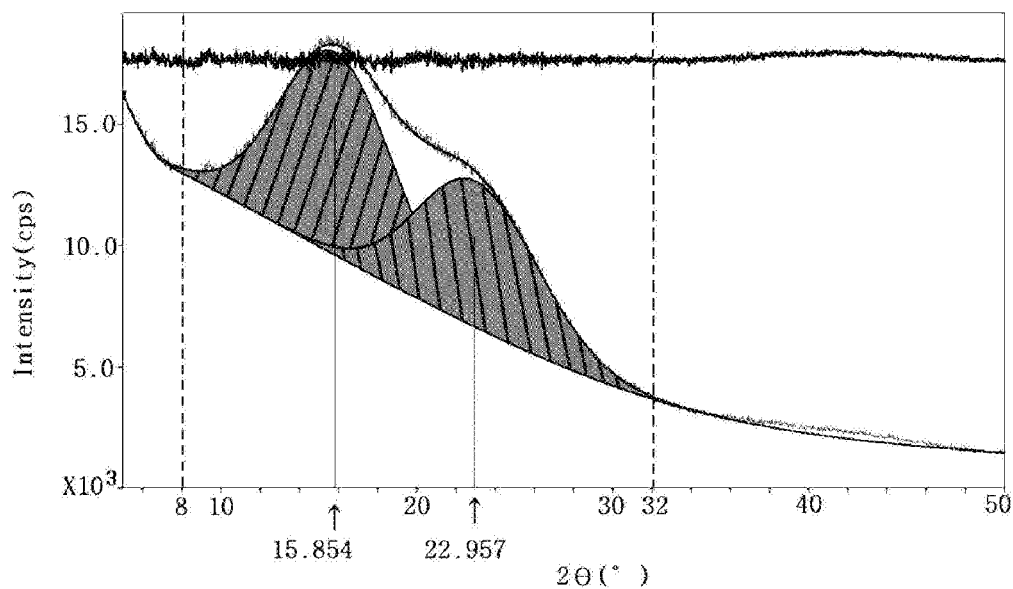
[Fig. 2]
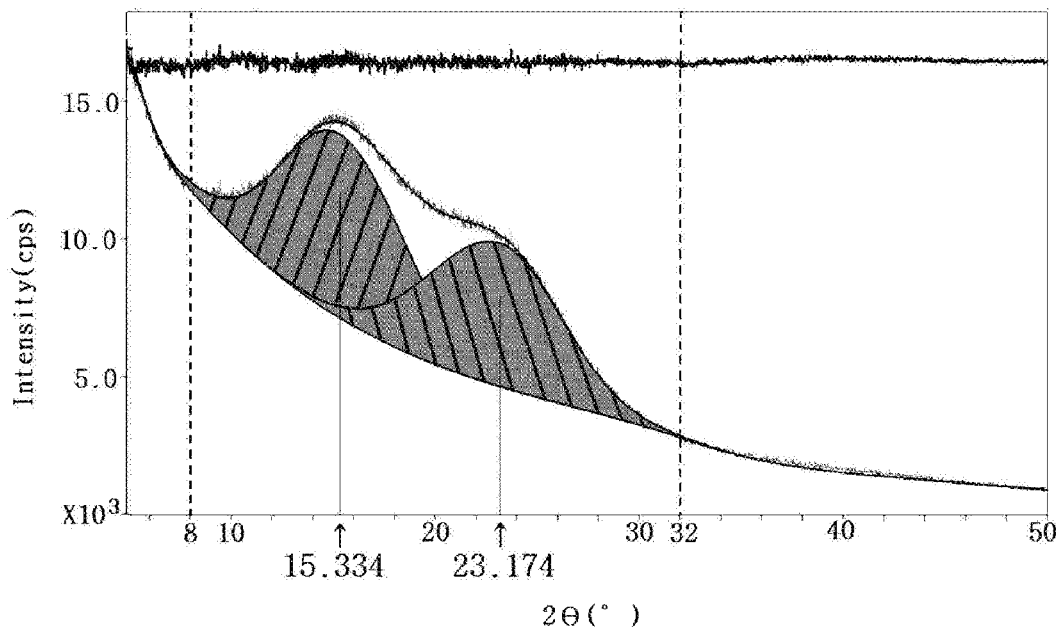

[Fig. 3]
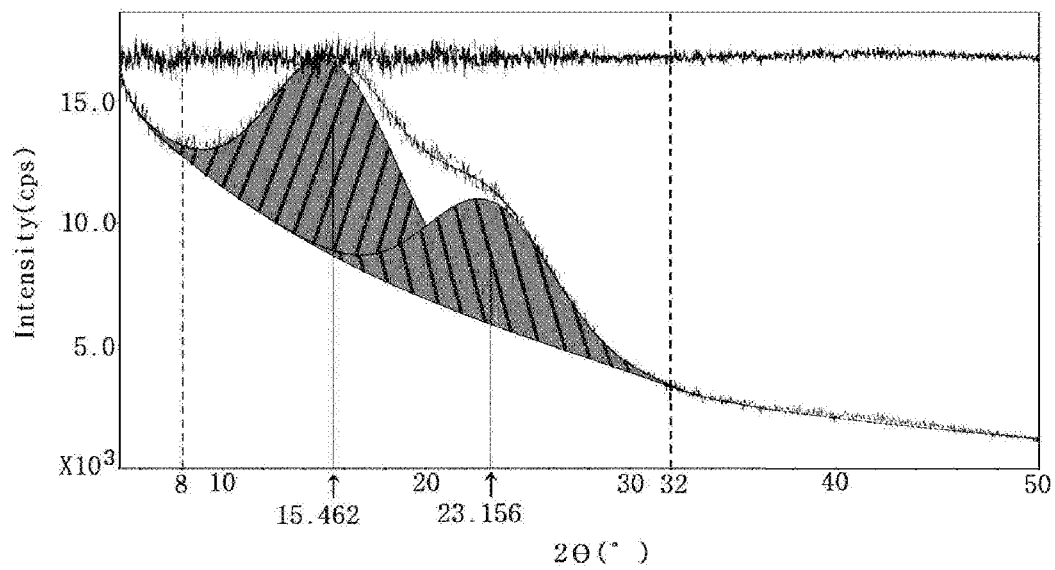
[Fig. 4]
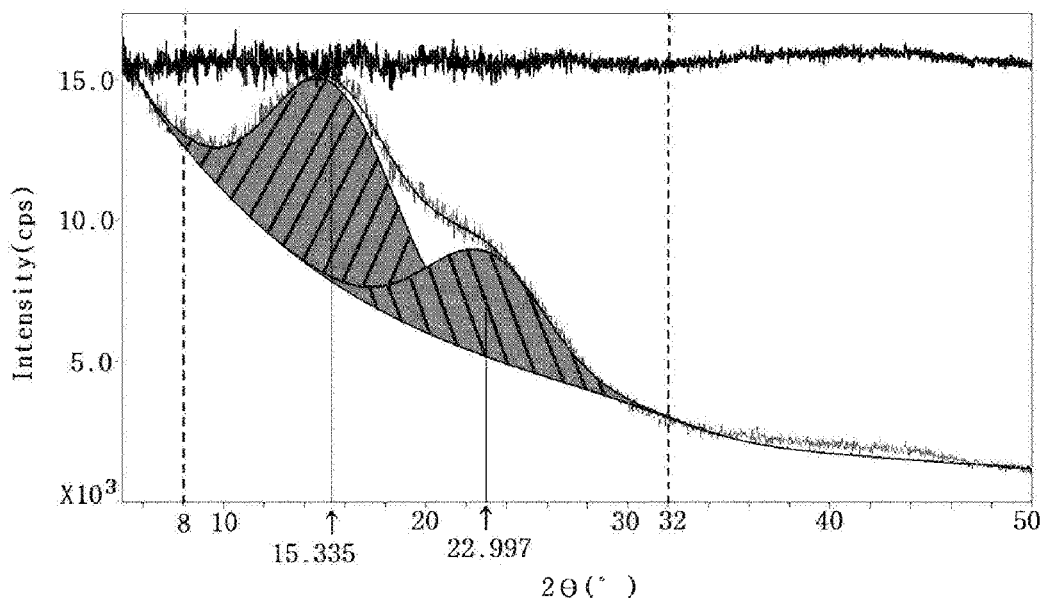

[Fig. 5]
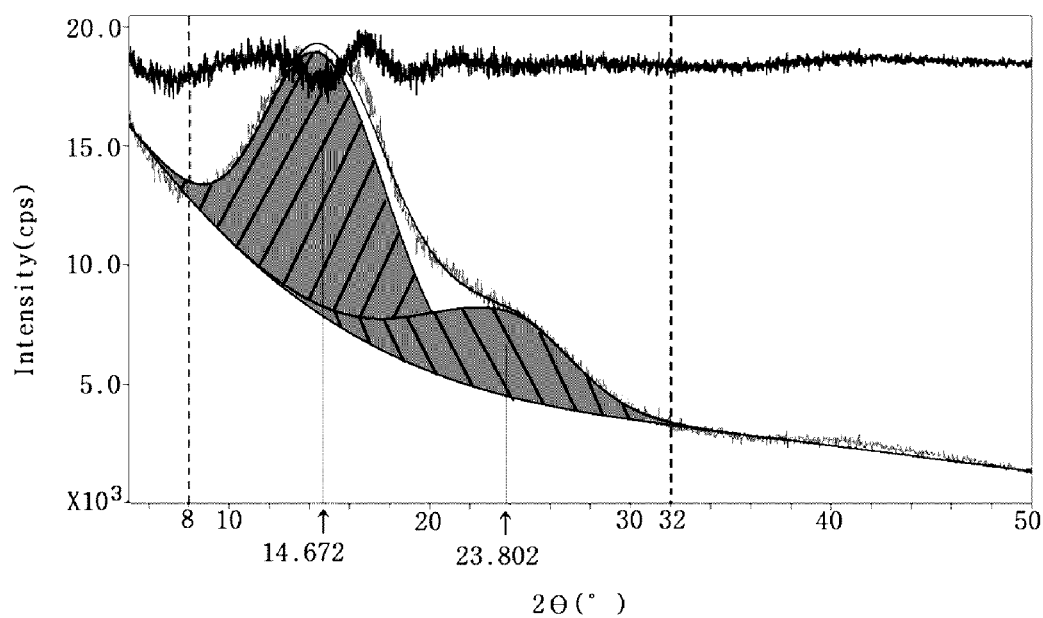

POLYAMIDE-IMIDE FILM AND METHOD FOR PRODUCING SAME

CROSS-REFERENCE TO RELATED APPLICATION

This application is a division of U.S. patent application Ser. No. 16/477,664 filed on Jul. 12, 2019, which is a national stage entry of an international patent application No. PCT/KR2018/001567 filed on Feb. 6, 2018, which claims the benefit of Korean Patent Application Serial Nos. 10-2017-017550 filed on Feb. 8, 2017 and 10-2017-0122035 filed on Sep. 21, 2017. The disclosure of each of the foregoing application is incorporated herein by reference in its entirety.

TECHNICAL FIELD

Embodiments relate to a polyamide-imide film having specific XRD characteristics and being colorless, transparent, and excellent in mechanical properties and optical properties, and a process for preparing the same.

BACKGROUND ART

Since polyamide-imide (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Polyamide-imide is used in various fields. For example, polyamide-imide is made in the form of a powder and used as a coating for a metal or a magnetic wire. It is mixed with other additives depending on the application thereof. In addition, polyamide-imide is used together with a fluoropolymer as a painter for decoration and corrosion prevention. It also plays a role of bonding a fluoropolymer to a metal substrate. Further, polyamide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics.

DISCLOSURE OF INVENTION

Technical Problem

Embodiments aim to provide a polyamide-imide film having specific XRD characteristics and being colorless, transparent, and excellent in mechanical properties and optical properties, and a process for producing the same.

Solution to Problem

According to an embodiment, there is provided a polyamide-imide film, which comprises a polyamide-imide polymer formed by polymerizing an aromatic diamine compound, an aromatic dianhydride compound, and a dicarbonyl compound, wherein the peak area in the vicinity of $2\theta=23°$ is 50% or more based on the peak area in the vicinity of $2\theta=15°$ when a base line is taken in the region between $2\theta=8°$ and $32°$ in an XRD graph of the polyamide-imide film.

According to another embodiment, there is provided a process for producing a polyamide-imide film, which comprises polymerizing an aromatic diamine compound, an aromatic dianhydride compound, and a dicarbonyl compound to prepare a polyamide-imide polymer solution; charging the polymer solution into a tank; extruding and casting the polymer solution in the tank and then drying the cast polymer solution to prepare a gel sheet; and thermally treating the gel sheet, wherein the viscosity of the polymer solution is 100,000 to 300,000 cps, the thermal treatment is carried out in a temperature range of 80 to 500° C. at a temperature elevation rate of 2° C./min to 80° C./min for 5 to 40 minutes, and the maximum temperature in the thermal treatment is 300 to 500° C.

Advantageous Effects of Invention

The polyamide-imide film according to the embodiment has specific XRD characteristics and is colorless, transparent, and excellent in mechanical properties and optical properties.

The process for producing a polyamide-imide film according to the embodiment is capable of providing a polyamide-imide film having specific XRD characteristics and being colorless, transparent, and excellent in mechanical properties and optical properties.

BRIEF DESCRIPTION OF THE DRAWINGS

FIG. 1 is an XRD graph of the film produced in Example 1.

FIG. 2 is an XRD graph of the film produced in Example 2.

FIG. 3 is an XRD graph of the film produced in Example 3.

FIG. 4 is an XRD graph of the film produced in Comparative Example 1.

FIG. 5 is an XRD graph of the film produced in Comparative Example 2.

BEST MODE FOR CARRYING OUT THE INVENTION

Hereinafter, the present invention will be described in detail with reference to the examples. The examples may be modified into various forms as long as the gist of the invention is not altered.

In this specification, when a part is referred to as "comprising" an element, it is to be understood that the part may comprise other elements as well, unless otherwise indicated.

Further, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

[Polyamide-Imide Film]

An Embodiment provides a polyamide-imide film having specific XRD characteristics and being colorless, transparent, and excellent in mechanical properties and optical properties.

The polyamide-imide film according to the embodiment comprises a polyamide-imide polymer formed by polymerizing an aromatic diamine compound, an aromatic dianhydride compound, and a dicarbonyl compound.

The molar ratio of the aromatic diamine compound to the aromatic dianhydride compound may be 10:2 to 10:4, specifically 10:2 to 10:3. If the above molar ratio range is satisfied, it is possible to provide a polyamide-imide film that is excellent in mechanical properties and optical properties.

The polyamide-imide polymer comprises an imide repeat unit derived from the polymerization of the aromatic diamine compound and the aromatic dianhydride compound and amide repeat units derived from the polymerization of the aromatic diamine compound and the dicarbonyl compound.

The aromatic diamine compound is a compound that forms an imide bond with the aromatic dianhydride compound and forms amide bonds with the dicarbonyl compound, to thereby form a copolymer.

In an embodiment, one kind of aromatic diamine may be used as the aromatic diamine compound. If a single kind of aromatic diamine compound is used, the chemical structure of the polyamide-imide polymer can be easily designed, and the process efficiency can be enhanced.

For example, the aromatic diamine compound may comprise 2,2'-bis(trifluoromethyl)-4,4'-diaminobiphenyl (TFDB) represented by the following Formula 1, but it is not limited thereto.

[Formula 1]

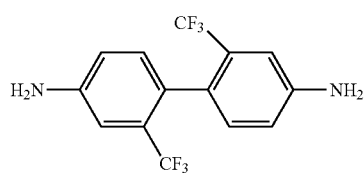

The aromatic dianhydride compound is a compound that can contribute to improvements in the optical properties such as transmittance of the polyamide-imide film, since it has a low birefringence value.

In an embodiment, one kind of aromatic dianhydride may be used as the aromatic diamine compound. If a single kind of aromatic diamine compound is used, the chemical structure of the polyamide-imide polymer can be easily designed, and the process efficiency can be enhanced.

The aromatic dianhydride compound may comprise a compound having a fluorine-containing substituent. Or the aromatic dianhydride compound may be composed of a compound having a fluorine-containing substituent. In such event, the fluorine-containing substituent may be a fluorinated hydrocarbon group and specifically may be a trifluoromethyl group. But it is not limited thereto.

For example, the aromatic dianhydride compound may comprise 2,2'-bis-(3,4-dicarboxyphenyl) hexafluoropropane dianhydride (6-FDA) represented by the following Formula 2, but it is not limited thereto.

[Formula 2]

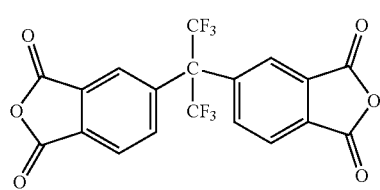

The aromatic diamine compound and the dianhydride compound may be polymerized to form a polyamic acid.

Subsequently, the polyamic acid may be converted to a polyimide through a dehydration reaction, and the polyimide comprises an imide repeat unit.

For example, the polyimide may comprise a compound represented by the following Formula 3, but it is not limited thereto.

[Formula 3]

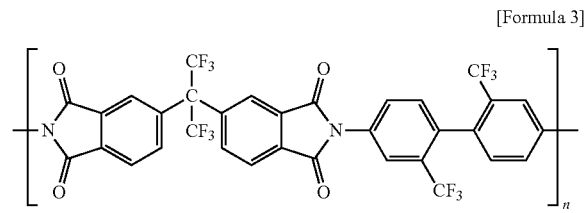

In the above Formula 3, n is an integer of 1 to 400.

The dicarbonyl compound may comprise at least two dicarbonyl compounds different from each other.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyamide-imide film thus produced.

In an embodiment, two kinds of aromatic dicarbonyl compound may be used as the dicarbonyl compound. If two kinds of aromatic dicarbonyl compound are used, the chemical structure of the polyamide-imide polymer can be designed to materialize the desired properties, and the process efficiency can be enhanced.

The dicarbonyl compound may comprise terephthaloyl chloride (TPC), 1,1'-biphenyl-4,4'-dicarbonyl dichloride (BPDC), or a combination thereof. But it is not limited thereto.

For example, the first dicarbonyl compound may comprise 1,1'-biphenyl-4,4'-dicarbonyl dichloride (BPDC) represented by the following Formula 4, but it is not limited to.

[Formula 5]

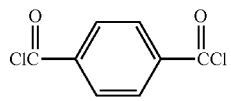

Further, the second dicarbonyl compound may comprise terephthaloyl chloride (TPC) represented by the following Formula 5, but it is not limited thereto.

[Formula 4]

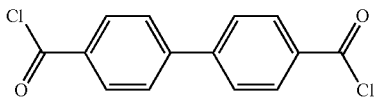

If 1,1'-biphenyl-4,4'-dicarbonyl dichloride (BPDC) is used as the first dicarbonyl compound and terephthaloyl chloride (TPC) is used as the second dicarbonyl compound in a proper combination, the polyamide-imide film thus produced may have high oxidation resistance.

In addition, the aromatic diamine compound and the dicarbonyl compound may be polymerized to form amide repeat units represented by the following Formulae 6 and 7.

[Formula 6]

[Formula 7]

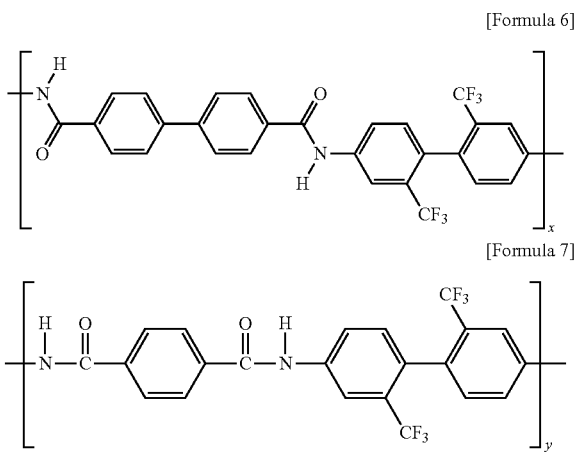

In the above Formula 6, x is an integer of 1 to 400.

In the above Formula 7, y is an integer of 1 to 400.

The polyamide-imide film according to another embodiment may comprise a polyamide-imide polymer formed by polymerizing an aromatic diamine compound, an aromatic dianhydride compound, and a dicarbonyl compound, wherein the aromatic diamine compound may comprise one kind of aromatic diamine compound, the aromatic dianhydride compound may comprise one kind of aromatic dianhydride compound, and the dicarbonyl compound may comprise two kinds of aromatic dicarbonyl compound.

For example, the aromatic diamine compound may comprise 2,2'-bis(trifluoromethyl)-4,4'-diaminobiphenyl (TFDB), the aromatic dianhydride compound may comprise 2,2'-bis(3,4-dicarboxyphenyl) hexafluoropropane dianhydride (6-FDA), and the dicarbonyl compound may comprise terephthaloyl chloride (TPC), 1,1'-biphenyl-4,4'-dicarbonyl dichloride (BPDC), or a combination thereof. But they are not limited thereto.

Alternatively, the aromatic diamine compound may be composed of one kind of diamine compound, the aromatic dianhydride compound may be composed of one kind of aromatic dianhydride compound, and the dicarbonyl compound may be composed of two kinds of dicarbonyl compound.

For example, the aromatic diamine compound may be composed of 2,2'-bis(trifluoromethyl)-4,4'-diaminobiphenyl (TFDB), the aromatic dianhydride compound may be composed of 2,2'-bis(3,4-dicarboxyphenyl) hexafluoropropane dianhydride (6-FDA), and the dicarbonyl compound may be composed of terephthaloyl chloride (TPC) and 1,1'-biphenyl-4,4'-dicarbonyl dichloride (BPDC).

An embodiment is characterized in that it is capable of providing a polyamide-imide film whose optical characteristics, mechanical properties, and flexibility are improved in a well-balanced manner without a complicated process by properly controlling the content of the imide repeat unit and those of the amide repeat units.

Further, it is possible to provide a polyamide-imide film whose optical characteristics, mechanical properties, and flexibility are improved in a well-balanced manner without such steps as precipitation, filtration, drying, and redissolution as adopted in the prior art.

The content of the imide repeat unit and those of the amide repeat units may be controlled by the amounts of the aromatic dianhydride compound and the dicarbonyl compound.

In the polyamide-imide polymer contained in the polyamide-imide film, the molar ratio of the imide repeat unit to the amide repeat units may be 50:50 to 20:80, but it is not limited thereto.

If the molar ratio of the imide repeat unit to the amide repeat units is within the above range, the polyamide-imide film is excellent in such optical properties as transmittance and haze.

In an XRD graph of the polyamide-imide film, the peak area in the vicinity of $2\theta=23°$ is 50% or more based on the peak area in the vicinity of $2\theta=15°$ when a base line is taken in the region between $2\theta=8°$ and $32°$. Specifically, the peak area in the vicinity of $2\theta=23°$ may be 55% or more, 60% or more, 65% or more, 70% or more, or 75% or more, based on the peak area in the vicinity of $2\theta=15°$ when a base line is taken in the region between $2\theta=8°$ and $32°$, but it is not limited thereto. More specifically, the peak area in the vicinity of $2\theta=23°$ may be 50% to 98%, 55% to 98%, 60% to 98%, 65% to 98%, 70% to 98%, 75% to 98%, 50% to 95%, 55% to 95%, 60% to 95%, 65% to 95%, 70% to 95%, 75% to 95%, 50% to 90%, 55% to 90%, 60% to 90%, 65% to 90%, 70% to 90%, 75% to 90%, or 75% to 85%, based on the peak area in the vicinity of $2\theta=15°$ when a base line is taken in the region between $2\theta=8°$ and $32°$, but it is not limited thereto.

The vicinity of $2\theta=15°$ refers to $2\theta=15°\pm1°$, and the vicinity of $2\theta=23°$ refers to $2\theta=23°\pm1°$.

The polyamide-imide film has a modulus of 5.0 GPa or more based on a thickness of 50 μm. Specifically, the modulus may be 5.2 GPa or more, 5.3 GPa or more, 5.4 GPa, or 5.5 GPa or more, but it is not limited thereto.

The polyamide-imide film has a surface hardness of HB or higher. Specifically, the surface hardness may be H or higher or 2H or higher, but it is not limited thereto.

The polyamide-imide film has a yellow index (YI) of 5 or less based on a thickness of 50 μm. Specifically, the yellow index may be 4.5 or less, but it is not limited thereto. More specifically, the yellow index may be 4.4 or less, 4.3 or less, 4.1 or less, 4.0 or less, 3.9 or less, 3.8 or less, or 3.6 or less, but it is not limited thereto.

The polyamide-imide film has a haze of 2% or less based on a thickness of 50 μm. Specifically, the haze may be 1.8% or less or 1.5% or less, but it is not limited thereto. More specifically, the haze may be 1.0% or less or 0.9% or less, but it is not limited thereto.

The polyamide-imide film has a light transmittance measured at 550 nm of 85% or more based on a thickness of 50 μm. Specifically, the light transmittance measured at 550 nm based on a thickness of 50 μm may be 88% or more or 89% or more, but it is not limited thereto.

The polyamide-imide film has a tensile strength of 15 kgf/mm$^2$ or more based on a thickness of 50 μm. Specifically, the tensile strength may be 18 kgf/mm$^2$ or more, but it is not limited thereto.

The polyamide-imide film has an elongation of 15% or more based on a thickness of 50 μm. Specifically, the elongation may be 16% or more, but it is not limited thereto.

The various characteristics of the polyamide-imide film described above may be combined.

For example, the polyamide-imide film may comprise a polyamide-imide polymer formed by polymerizing an aromatic diamine compound, an aromatic dianhydride compound, and a dicarbonyl compound, wherein the peak area in the vicinity of 2θ=23° may be 50% or more based on the peak area in the vicinity of 2θ=15° when a base line is taken in the region between 2θ=8° and 32° in an XRD graph of the polyamide-imide film.

As another example, the peak area in the vicinity of 2θ=23° may be 50% or more based on the peak area in the vicinity of 2θ=15° when a base line is taken in the region between 2θ=8° and 32° in an XRD graph of the polyamide-imide film, and the polyamide-imide film may have a modulus of 5.0 GPa or more, a surface hardness of HB or higher, a yellow index of 5 or less, a haze of 2% or less, a light transmittance measured at 550 nm of 85% or more, based on a thickness of 50 μm.

As another example, the polyamide-imide film may comprise a polyamide-imide polymer formed by polymerizing an aromatic diamine compound, an aromatic dianhydride compound, and a dicarbonyl compound, wherein the aromatic diamine compound may comprise 2,2'-bis(trifluoromethyl)-4,4'-diaminobiphenyl (TFDB), the aromatic dianhydride compound may comprise 2,2'-bis(3,4-dicarboxyphenyl) hexafluoropropane dianhydride (6-FDA), and the dicarbonyl compound may comprise terephthaloyl chloride (TPC), 1,1'-biphenyl-4,4'-dicarbonyl dichloride (BPDC), or a combination thereof.

[Process for Producing a Polyamide-Imide Film]

The process for producing a polyamide-imide film according to an embodiment comprises polymerizing an aromatic diamine compound, an aromatic dianhydride compound, and a dicarbonyl compound to prepare a polyamide-imide polymer solution; charging the polymer solution into a tank; extruding and casting the polymer solution in the tank and then drying the cast polymer solution to prepare a gel sheet; and thermally treating the gel sheet, wherein the viscosity of the polymer solution is 100,000 to 300,000 cps.

In addition, the dicarbonyl compound may comprise a first dicarbonyl compound and a second dicarbonyl compound. In such event, the step of preparing a polymer solution may comprise polymerizing an aromatic diamine compound, an aromatic dianhydride compound, a first dicarbonyl compound, and a second dicarbonyl compound in an organic solvent to obtain a first polymer solution; and further adding the second dicarbonyl compound to the first polymer solution to obtain a second polymer solution, but it is not limited thereto.

Specifically, the process for producing a polyamide-imide film comprises polymerizing an aromatic diamine compound, an aromatic dianhydride compound, a first dicarbonyl compound, and a second dicarbonyl compound in an organic solvent to obtain a first polymer solution; further adding the second dicarbonyl compound to the first polymer solution to obtain a second polymer solution having a viscosity of 100,000 to 300,000 cps; charging the second polymer solution into a tank; extruding and casting the second polymer solution in the tank and then drying the cast second polymer solution to prepare a gel sheet; and thermally treating the gel sheet.

The organic solvent employed in the polymerization reaction may be at least one selected from the group consisting of dimethylformamide (DMF), dimethylacetamide (DMAc), N-methyl-2-pyrrolidone (NMP), m-cresol, tetrahydrofuran (THF), and chloroform, but it is not limited thereto. Specifically, the organic solvent employed in the polymerization reaction may be dimethylacetamide (DMAc), but it is not limited thereto.

The step of obtaining the first polymer solution may comprise simultaneously or sequentially polymerizing the aromatic diamine compound, the aromatic dianhydride compound, the first dicarbonyl compound, and the second dicarbonyl compound.

Specifically, in an embodiment, the step of obtaining the first polymer solution may comprise simultaneously polymerizing the aromatic diamine compound, the aromatic dianhydride compound, the first dicarbonyl compound, and the second dicarbonyl compound.

In another embodiment, the step of obtaining the first polymer solution may comprise polymerizing the aromatic diamine compound and the aromatic dianhydride compound to obtain a polyamic acid solution; and adding the first dicarbonyl compound and the second dicarbonyl compound to the polyamic acid solution to polymerize them. The polyamic acid solution is a solution comprising a polyamic acid.

In another embodiment, the step of obtaining the first polymer solution may comprise polymerizing the aromatic diamine compound and the aromatic dianhydride compound to obtain a polyamic acid solution; subjecting the polyamic acid solution to a dehydration reaction to obtain a polyimide solution; and adding the first dicarbonyl compound and the second dicarbonyl compound to the polyimide solution to polymerize them. The polyimide solution is a solution comprising a polymer having an imide repeat unit.

In another embodiment, the step of obtaining the first polymer solution may comprise polymerizing the aromatic diamine compound, the first dicarbonyl compound, and the second dicarbonyl compound to obtain an amide polymer solution; and adding the aromatic dianhydride compound to the amide polymer solution to polymerize them. The amide polymer solution is a solution comprising a polymer having amide repeat units.

The copolymer comprised in the first polymer solution comprises an imide repeat unit derived from the polymerization of the aromatic diamine compound and the aromatic dianhydride compound and amide repeat units derived from the polymerization of the aromatic diamine compound and the dicarbonyl compound.

A catalyst may be further added in the step of obtaining the first polymer solution, in the step of obtaining the second polymer, or after the step of obtaining the second polymer.

Examples of the catalyst include, but are not limited to, beta picoline, acetic anhydride, and the like.

The further addition of the catalyst may expedite the reaction rate and produce the effect of improving the bonding force between the repeat unit structures or that within the repeat unit structure.

In addition, the viscosity of the polymer solution may be appropriately adjusted in the steps of adding the catalyst, drying and redissolving the polymer solution, or the step of adding the solvent for the extrusion step.

In another embodiment, the step of obtaining the first polymer solution may comprise adding the aromatic dianhydride compound, the first dicarbonyl compound, and the second dicarbonyl compound to an excessive amount of the aromatic diamine compound.

Specifically, the aromatic dianhydride compound may be employed in an amount of 20% by mole to 50% by mole based on the total moles of the aromatic dianhydride compound, the first dicarbonyl compound, and the second dicarbonyl compound, but it is not limited thereto.

If the content of the aromatic dianhydride compound is within the above range, the polyamide-imide film has excellent mechanical properties in terms of modulus, tensile strength, elongation, surface hardness, and the like.

In addition, the first dicarbonyl compound and the second dicarbonyl compound may be employed in an amount of 50% by mole to 80% by mole based on the total moles of the aromatic dianhydride compound, the first dicarbonyl compound, and the second dicarbonyl compound, but it is not limited thereto.

If the content of the dicarbonyl compounds is within the above range, the polyamide-imide film has excellent optical properties in terms of light transmittance, haze, and the like.

In the step of obtaining the first polymer solution in another embodiment, the first dicarbonyl compound may be employed in an amount of 50% by mole to 70% by mole based on the total moles of the first dicarbonyl compound and the second dicarbonyl compound, but it is not limited thereto.

The first dicarbonyl compound may be 1,1'-biphenyl-4, 4'-dicarbonyl dichloride (BPDC), and the second dicarbonyl compound may be terephthaloyl chloride (TPC).

If the content of the first dicarbonyl compound is less than 50% by mole, such physical properties as tensile strength, modulus, and the like of the polyamide-imide film may be deteriorated. If the content of the first dicarbonyl compound exceeds 70% by mole, such optical properties as haze and the like may be deteriorated.

Preferably, in the step of obtaining the first polymer solution, (I) an excessive amount of the aromatic diamine compound at least in the same molar amount as that of the other reactants, (II) 20% by mole to 50% by mole of the aromatic dianhydride compound based on the total moles of the aromatic dianhydride compound, the first dicarbonyl compound, and the second dicarbonyl compound, and (III) 50% by mole to 80% of the first dicarbonyl compound and the second dicarbonyl compound based on the total moles of the aromatic dianhydride compound, the first dicarbonyl compound, and the second dicarbonyl compound may be employed.

Specifically, 50% by mole to 70% of the first dicarbonyl compound (e.g., 1,1'-biphenyl-4,4'-dicarbonyl dichloride, BPDC) and 30% by mole to 50% of the second dicarbonyl compound (e.g., terephthaloyl chloride, TPC) based on the total moles of the first dicarbonyl compound and the second dicarbonyl compound may be employed.

It is possible to provide a polyamide-imide film whose optical characteristics, mechanical properties, and flexibility are improved in a well-balanced manner without such steps as precipitation, filtration, drying, and redissolution as adopted in the prior art by properly controlling the content of the imide repeat unit and those of the amide repeat units.

After the step of obtaining the first polymer solution, the second polymer solution having a viscosity of 100,000 to 300,000 cps may be obtained by further adding the second dicarbonyl compound to the first polymer solution.

The weight ratio of the second dicarbonyl compound added in the step of obtaining the first polymer solution to the second dicarbonyl compound added in the step of obtaining the second polymer solution may be 90:10 to 99:1, but it is not limited thereto.

In addition, the second dicarbonyl compound added in the step of obtaining the second polymer solution may be in the form of a solution in which the second dicarbonyl compound is dissolved in an organic solvent at a concentration of 5 to 20% by weight, but it is not limited thereto.

This is advantageous in that the desired viscosity can be accurately achieved.

The viscosity of the second polymer solution may be 100,000 to 300,000 cps, but it is not limited thereto.

If the viscosity of the second polymer solution is within the above range, a polyamide-imide film can be effectively produced in the extrusion and casting steps. In addition, the polyamide-imide film thus produced may have mechanical properties in terms of an improved modulus and the like.

According to an embodiment, the content of solids contained in the second polymer solution may be 10% by weight to 20% by weight. Specifically, the content of solids contained in the second polymer solution may be 12% by weight to 18% by weight, but it is not limited thereto.

If the content of solids contained in the second polymer solution is within the above range, a polyamide-imide film can be effectively produced in the extrusion and casting steps. In addition, the polyamide-imide film thus produced may have mechanical properties in terms of an improved modulus and the like and optical properties in terms of a low yellow index and the like.

After the second polymer solution is obtained, the pH of the second polymer solution may be adjusted by adding a neutralizing agent.

Examples of the neutralizing agent include, but are not limited to, amine-based neutralizing agents such as alkoxyamine, alkylamine, alkanolamine, and the like.

The neutralizing agent may be employed in an amount of about 0.1% by mole to about 10% by mole based on the total number of moles of monomers in the polyamide-imide polymer solution.

The pH of the second polymer solution adjusted by the neutralizing agent may be about 4 to about 7. Specifically, the adjusted pH of the second polymer solution may be about 4.5 to about 7.

If the pH of the second polymer solution is within the above-described range, it is possible to prevent damage to the equipment in the subsequent extrusion and casting steps. Further, the polyamide-imide film thus produced may have an effect in that its optical properties are improved by, for example, lowering the yellow index or preventing increases in the yellow index and that its mechanical properties are improved in terms of modulus and the like.

After the step of obtaining the polymer solution or the step of obtaining the second polymer solution, the polymer solution is charged into a tank.

Here, once the polymer solution is obtained, the step of transferring the polymer solution to the tank is carried out without any additional steps. Specifically, the polymer solution prepared in the polymerization equipment is transferred to, and stored in, the tank without any separate precipitation and redissolution steps in order to remove impurities. In the conventional process, in order to remove impurities such as hydrochloric acid (HCl) generated during the preparation of a polymer solution, a polymer solution prepared is purified through a separate step to remove impurities, and the purified polymer solution is then redissolved in a solvent. In this case, however, there has been a problem that the loss of the active ingredient increases in the step of removing the impurities, resulting in decreases in the yield.

Accordingly, the production process according to the embodiment ultimately minimizes the amount of impurities generated in the step of preparing a polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

Here, the temperature inside the tank is preferably −20 to 0° C. This is to prevent degradation of the charged polymer solution and to lower the moisture content therein.

After the step of charging the prepared polymer solution into the tank, the process may further comprise vacuum degassing for 1 to 2 hours until the pressure in the tank is lowered to 0.2 to 0.4 bar.

Alternatively, after the step of charging the prepared polymer solution into the tank, the process may further comprise purging the tank with nitrogen gas at 1 to 2 atmospheres.

The step of vacuum degassing and the step of purging the tank with nitrogen gas are performed in a separate process, respectively.

For example, the step of vacuum degassing may be carried out, followed by the step of purging the tank with nitrogen gas, but it is not so limited.

The step of vacuum degassing and/or the step of purging the tank with nitrogen may improve the physical properties of the surface of the polyamide-imide film thus produced.

Then, the polymer solution in the tank is extruded and cast, followed by drying the cast polymer solution to prepare a gel sheet.

In the above extrusion and casting steps, the above-mentioned organic solvent may be used.

The polymer solution is extruded and cast onto a casting body such as a casting roll, a casting belt, and the like. In such event, the polymer solution is cast at a rate of about 0.5 m/min to about 15 m/min and in a thickness of 200 to 700 μm onto the casting body. If the extrusion and casting rates are within the above ranges, the polyamide-imide film thus produced by the production process according to the embodiment can have improved optical characteristics and mechanical characteristics.

That is, if the polymer solution has a viscosity in the above-mentioned range, the extrusion and casting at the extrusion rate as described above may be advantageous to have improved optical characteristics and mechanical characteristics.

After the polymer solution is cast onto a casting body, the solvent contained in the polymer solution is removed by a drying step to thereby form a gel sheet on the casting body.

The drying step may be carried out at a temperature of from about 60° C. to about 150° C. for a period of time ranging from about 5 minutes to about 60 minutes.

Thereafter, the gel sheet is thermally treated to thereby produce the polyamide-imide film according to the embodiment.

The thermal treatment may be carried out in a temperature range of 80 to 500° C. at a temperature elevation rate of 2° C./min to 80° C./min for 5 to 40 minutes or 5 to 30 minutes. Specifically, the thermal treatment may be carried out in a temperature range of 80 to 470° C. at a temperature elevation rate of 10° C./min to 80° C./min for 5 to 30 minutes or 5 to 20 minutes.

The maximum temperature in the thermal treatment may be 300 to 500° C. or 320 to 500° C. More specifically, the maximum temperature in the thermal treatment may be 350 to 500° C., 380 to 500° C., 400 to 500° C., 410 to 480° C., 410 to 470° C., or 410 to 450° C., but it is not limited thereto.

After the thermal treatment step, a step of lowering the temperature of the thermally treated sheet may be further carried out. The temperature lowering step may comprise a first temperature lowering step of reducing the temperature at a rate of 100° C./min to 1,000° C./min and a second temperature lowering step of reducing the temperature at a rate of 40° C./min to 400° C./min.

Specifically, the second temperature lowering step is performed after the first temperature lowering step.

In addition, the temperature lowering rate of the first temperature lowering step may be faster than the temperature lowering rate of the second temperature lowering step.

For example, the maximum rate of the first temperature lowering step is faster than the maximum rate of the second temperature lowering step. Or the minimum rate of the first temperature lowering step is faster than the minimum rate of the second temperature lowering steps.

Since the polyamide-imide polymer has high oxidation resistance, it is hardly affected by oxygen contained in the atmosphere during the thermal treatment step. Thus, the polyamide-imide film according to the embodiment may have improved optical characteristics.

In addition, nitrogen gas purging is carried out when a polyimide film is formed in the conventional process in order to prevent yellowing of the film and to secure transparency of the film. According to the embodiment, however, a polyamide-imide film having excellent optical characteristics can be produced without such nitrogen gas purging.

Details on the polyamide-imide film produced by the process for producing a polyamide-imide film are referenced to the description given in the above section of [Polyamide-imide film].

For example, the peak area in the vicinity of 2θ=23° is 50% or more based on the peak area in the vicinity of 2θ=15° when a base line is taken in the region between 2θ=8° and 32° in an XRD graph of the polyamide-imide film produced by the above production process.

MODE FOR THE INVENTION

Hereinafter, the present invention will be described in detail by referring to Examples. But the following Examples are intended to further illustrate the present invention, and the scope of the present invention is not limited thereto.

Examples 1 to 3

Dimethyl acetamide (DMAc) as an organic solvent was charged in a 1 L glass reactor equipped with a temperature-controllable double jacket under a nitrogen atmosphere at 20° C. Then, 2,2'-bis(trifluoromethyl)-4,4'-diaminobiphenyl (TFDB) as an aromatic diamine was slowly added thereto for dissolution thereof.

Subsequently, while 2,2'-bis(3,4-dicarboxyphenyl)hexafluoropropane dianhydride (6-FDA) as an aromatic dianhydride was slowly added thereto, the mixture was stirred for 1 hour.

Then, 1,1'-biphenyl-4,4'-dicarbonyldichloride (BPDC) as a first dicarbonyl compound was added, followed by stirring for 1 hour. And terephthaloyl chloride (TPC) as a second dicarbonyl compound was added, followed by stirring for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 mL of the TPC solution was added to the first polymer solution, followed by stirring for 30 minutes. This procedure was repeated until the viscosity fell within the range of 100,000 cps to 300,000 cps, thereby preparing a second polymer solution.

The second polymer solution was coated onto a glass plate and then dried with hot air at 80° C. for 30 minutes. The dried polyamide-imide polymer was peeled off from the glass plate, fixed to a pin frame, and thermally treated for 30 minutes in a temperature range of 80° C. to 500° C. at a temperature elevation rate of 2° C./min to 80° C./min to obtain a polyamide-imide film having a thickness of 50 μm.

According to the above Example, the yield reached about 100% immediately before the film formation step (i.e., immediately before coating). Here, the "yield" refers to the ratio of the number of moles of the materials remaining in the solution for coating to the number of moles of the charged materials.

According to the conventional production process, the yield immediately before the film formation step is about 60%, which attributes to the loss of the materials that inevitably takes place at the steps of polyimidization, precipitation, filtration, and drying. In Examples 1 to 3, a polyamide-imide film was each produced in the same manner as described above, except that the molar ratios of TFDB, 6-FDA, TPC, and BPDC and the maximum temperature during the thermal treatment step were as shown in Table 1 below.

Comparative Example 1

Dimethyl acetamide (DMAc) as an organic solvent was charged in a 1 L glass reactor equipped with a temperature-controllable double jacket under a nitrogen atmosphere at 20° C. Then, 2,2'-bis(trifluoromethyl)-4,4'-diaminobiphenyl (TFDB) as an aromatic diamine was slowly added thereto for dissolution thereof.

Subsequently, while 2,2'-bis(3,4-dicarboxyphenyl) hexafluoropropane dianhydride (6-FDA) as an aromatic dianhydride was slowly added thereto, the mixture was stirred for 1 hour.

Then, 1,1'-biphenyl-4,4'-dicarbonyldichloride (BPDC) as a first dicarbonyl compound was added, followed by stirring for 1 hour. Sebacoyl dichloride (SD) as a second dicarbonyl compound was added, followed by stirring for 1 hour. And terephthaloyl chloride (TPC) as a third dicarbonyl compound was added, followed by stirring for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 mL of the TPC solution was added to the first polymer solution, followed by stirring for 30 minutes. This procedure was repeated until the viscosity fell within the range of 100,000 cps to 300,000 cps, thereby preparing a second polymer solution.

The second polymer solution was coated onto a glass plate and then dried with hot air at 80° C. for 30 minutes. The dried polyamide-imide polymer was peeled off from the glass plate, fixed to a pin frame, and thermally treated for 30 minutes in a temperature range of 80° C. to 500° C. at a temperature elevation rate of 2° C./min to 80° C./min to obtain a polyamide-imide film having a thickness of 50 μm.

Comparative Example 2

Dimethyl acetamide (DMAc) as an organic solvent was charged in a 1 L glass reactor equipped with a temperature-controllable double jacket under a nitrogen atmosphere at 20° C. Then, 2,2'-bis(trifluoromethyl)-4,4'-diaminobiphenyl (TFDB) as an aromatic diamine was slowly added thereto for dissolution thereof.

Subsequently, while 2,2'-bis(3,4-dicarboxyphenyl) hexafluoropropane dianhydride (6-FDA) as an aromatic dianhydride was slowly added thereto, the mixture was stirred for 1 hour, thereby preparing a polymer solution.

The polymer solution was coated onto a glass plate and then dried with hot air at 80° C. for 30 minutes. The dried polyamide-imide polymer was peeled off from the glass plate, fixed to a pin frame, and thermally treated for 30 minutes in a temperature range of 80° C. to 500° C. at a temperature elevation rate of 2° C./min to 80° C./min to obtain a polyamide-imide film having a thickness of 50 μm.

TABLE 1

| | Molar ratio | | | | Max. temp. during thermal treatment (° C.) |
|---|---|---|---|---|---|
| | TFDB | 6-FDA | TPC | BPDC | SD | |
| Ex. 1 | 0.200 | 0.052 | 0.066 | 0.082 | — | 420 |
| Ex. 2 | 0.200 | 0.042 | 0.050 | 0.100 | — | 420 |
| Ex. 3 | 0.200 | 0.052 | 0.066 | 0.082 | — | 300 |
| C. Ex. 1 | 0.200 | 0.060 | 0.072 | 0.040 | 0.020 | 420 |
| C. Ex. 2 | 0.200 | 0.200 | — | — | — | 300 |

EVALUATION EXAMPLE

The films according to Examples 1 to 3 and Comparative Examples 1 and 2 were measured and evaluated for the following properties. The results are shown in Table 2 below and FIGS. 1 to 5.

Evaluation Example 1: Measurement of Film Thickness 5 points were measured in the width direction with a Digital Micrometer 547-401 manufactured by Mitsutoyo Corporation, Japan, and an average value thereof was taken as a thickness.

Evaluation Example 2: Measurement of Modulus

The compressive strength of a film was measured by a universal testing machine UTM 5566A of Instron. A sample was cut out by at least 5 cm in the direction perpendicular to the main shrinkage direction of the film and by 10 cm in the main shrinkage direction. It was fixed by the clips disposed at intervals of 5 cm in the machine. A stress-strain curve was obtained until the sample was fractured while it was stretched at a rate of 5 mm/min at room temperature. The slope of the load with respect to the initial strain in the stress-strain curve was taken as a modulus (GPa).

Evaluation Example 3: Measurement of Surface Hardness

The surface hardness was measured with a pencil hardness measuring instrument (CT-PC1, CORE TECH, Korea) with a pencil hardness measuring pencil mounted at an angle of 45° and at a pencil speed of 300 mm/min while a constant load (750 g) was applied. The pencil used was Mitsubishi pencils having a strength of H to 9H, F, HB, B to 6B, and the like.

Evaluation Example 4: Measurement of Yellow Index (YI)

The yellow Index (YI) was measured with a spectrophotometer (UltraScan PRO, Hunter Associates Laboratory) using a CIE colorimetric system.

Evaluation Example 5: Measurement of Light Transmittance and Haze (HZ)

The light transmittance at 550 nm and the haze were measured using a haze meter NDH-5000W manufactured by Nippon Denshoku Kogyo.

Evaluation Example 6: XRD Graph

A sample was irradiated with X-ray to measure the diffraction angle (2θ) of diffracted X-ray using an Ultima IV X-ray diffraction apparatus of Rigaku Corporation, Japan.

The region between 2θ=8° to 32° was taken as a base line in the XRD graph result thus obtained. The peak area in the vicinity of 2θ=15° and that in the vicinity of 2θ=23° were each obtained in a Gaussian type using the JADE 9 software supplied by MDI.

Next, the peak area in the vicinity of 2θ=23° with respect to the peak area in the vicinity of 2θ=15° taken as 100% was calculated in percent.

TABLE 2

|  | Thickness (μm) | Modulus (GPa) | Surface hardness | YI | Haze (%) | Transmittance (%, 550 nm) | Peak area 2θ = 15° | Peak area 2θ = 23° | XRD graph |
|---|---|---|---|---|---|---|---|---|---|
| Ex. 1 | 50 | 5.57 | 2H | 3.59 | 0.30 | 89.1 | 100 | 76.6 | FIG. 1 |
| Ex. 2 | 50 | 6.60 | 2H | 1.03 | 0.88 | 89.0 | 100 | 83.4 | FIG. 2 |
| Ex. 3 | 50 | 5.25 | 2H | 3.99 | 0.35 | 88.6 | 100 | 60.5 | FIG. 3 |
| C. Ex. 1 | 50 | 3.63 | 2H | 2.43 | 0.33 | 91.4 | 100 | 49.9 | FIG. 4 |
| C. Ex. 2 | 50 | 4.47 | 4B | 3.18 | 0.77 | 91.6 | 100 | 40.6 | FIG. 5 |

As shown in the above Table 2, it was confirmed that the peak area in the vicinity of 2θ=23° was 50% or more based on the peak area in the vicinity of 2θ=15° when a base line is taken in the region between 2θ=8° and 32° in an XRD graph of the polyamide-imide film in Examples 1 to 3, unlike Comparative Examples 1 and 2. Such specific XRD characteristics secure an excellent level of such characteristics as modulus, surface hardness, yellow index, haze, transmittance, and the like.

The invention claimed is:

1. A process for producing a polyamide-imide film, which comprises polymerizing an aromatic diamine compound, an aromatic dianhydride compound, and a dicarbonyl compound to prepare a polyamide-imide polymer solution; charging the polymer solution into a tank; extruding and casting the polymer solution in the tank and then drying the cast polymer solution to prepare a gel sheet; thermally treating the gel sheet; lowering a temperature of the thermally treated gel sheet after the thermal treatment step, wherein the viscosity of the polymer solution is 100,000 to 300,000 cps, the thermal treatment is carried out in a temperature range of 80 to 500° C. at a temperature elevation rate of 2° C./min to 80° C./min for 5 to 40 minutes, the maximum temperature in the thermal treatment is 400 to 500° C., the temperature lowering step comprises a first temperature lowering step of reducing the temperature at a rate of 100° C./min to 1,000° C./min and a second temperature lowering step of reducing the temperature at a rate of 40° C./min to 400° C./min; the second temperature lowering step is performed after the first temperature lowering step; and the temperature lowering rate of the first temperature lowering step is faster than the temperature lowering rate of the second temperature lowering step.

2. The process for producing a polyamide-imide film of claim 1, wherein the temperature inside the tank is −20 to 0° C.

3. The process for producing a polyamide-imide film of claim 1, which further comprises vacuum degassing for 1 to 2 hours until the pressure in the tank is lowered to 0.2 to 0.4 bar after the step of charging the prepared polymer solution into the tank.

4. The process for producing a polyamide-imide film of claim 1, which further comprises purging the tank with nitrogen gas at 1 to 2 atmospheres after the step of charging the prepared polymer solution into the tank.

5. The process for producing a polyamide-imide film of claim 1, wherein the drying is carried out at a temperature of 60° C. to 150° C. for a period of time ranging from 5 minutes to 60 minutes.

6. The process for producing a polyamide-imide film of claim 1, wherein the peak area in the vicinity of 2θ=23° is 50% or more based on the peak area in the vicinity of 2θ=15° when a base line is taken in the region between 2θ=8° and 32° in an XRD graph of the polyamide-imide film.

* * * * *